No. 628,935. C. O. GRUBE. Patented July 18, 1899.
FILTERING DEVICE.
(Application filed Aug. 22, 1898.)
(No Model.)
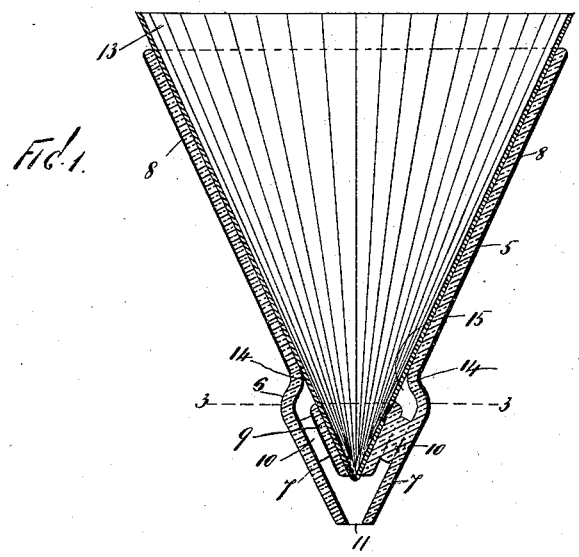
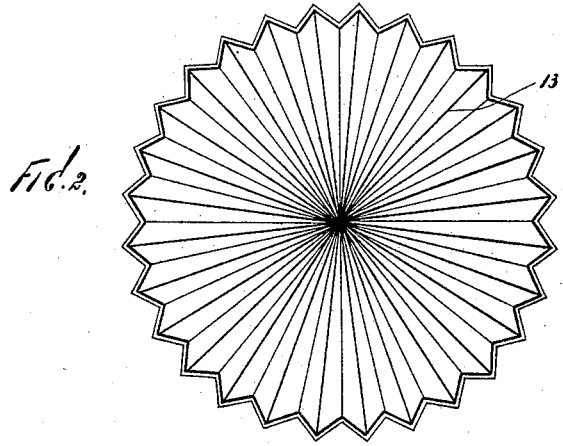
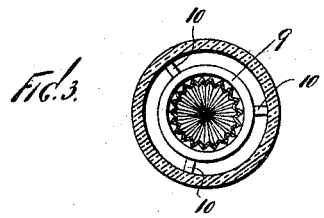
WITNESSES
John Buckler,
F. A. Stewart
INVENTOR
Charles O. Grube,
BY Edgar Tate
ATTORNEYS.

UNITED STATES PATENT OFFICE.

CHARLES O. GRUBE, OF NEW YORK, N. Y.

FILTERING DEVICE.

SPECIFICATION forming part of Letters Patent No. 628,935, dated July 18, 1899.

Application filed August 22, 1898. Serial No. 689,246. (No model.)

*To all whom it may concern:*

Be it known that I, CHARLES O. GRUBE, a citizen of the United States, residing at New York, in the county of New York and State of New York, have invented certain new and useful Improvements in Filtering Devices, of which the following is a full and complete specification, such as will enable those skilled in the art to which it appertains to make and use the same.

This invention relates to filtering devices, and particularly to devices of this class designed for use by druggists for filtering drugs and other liquid substances.

The invention is fully disclosed in the following specification, of which the accompanying drawings form a part, in which—

Figure 1 is a central vertical section of my improved filtering device; Fig. 2, a plan view of the filtering-paper which I employ, and Fig. 3 a cross-section on the line 3 3 of Fig. 1.

In the drawings forming part of this specification the separate parts of my improvement are designated by the same numerals of reference in each of the views, and in the practice of my invention I provide a funnel-shaped device 5, which is provided near its smaller end with an annular enlargement 6, below which the walls 7 of the end of the funnel are parallel with the upper walls 8.

Secured within the lower portion of the funnel and concentrically thereof is a hollow conical attachment 9, which is held in position by radial arms 10 and which is open at both ends, and the inner walls of the conical attachment 9 are in the same line with the inner walls of the upper portion of the funnel 5, and the apex of said attachment is directed downwardly and is vertically over the opening 11 in the apex of the funnel 5.

I also provide a funnel-shaped filtering device 13, which is composed of ordinary filtering-paper and the sides of which are convoluted or plaited, as clearly shown in the drawings, and this funnel-shaped filtering device is placed in the funnel 5 in the position shown in Fig. 1, and the apex thereof passes through the funnel-shaped attachment 9. The object of this construction is to provide increased facilities for the discharge of the liquids to be filtered through the filtering-paper, and with my improved construction the said liquids pass through the open apex of the funnel-shaped filtering device 13 and also through the sides thereof between the upper end of the funnel-shaped attachment 9 and the inwardly-directed shoulder or projection 14 of the funnel 5, formed by the annular enlargement 6, said parts forming an annular space 15, which communicates with the concentric space between the funnel-shaped attachment 9 and the lower portion of the funnel 5.

By reason of the inner walls of the upper part of the funnel 5 and the inner walls of the conical attachment 9 being in the same line the filtering-paper is held in place and prevented from crimping or breaking, and the liquids to be filtered pass freely therethrough in the usual manner.

My improved filtering device is simple in construction and operation and perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A filtering device consisting of a funnel, the apex end of which is enlarged, and a funnel-shaped attachment secured in said enlarged end concentrically thereof, whereby an annular space is formed around said funnel-shaped attachment, and a filtering-paper of conical shape set into said funnel, and the apex of which passes through said funnel-shaped attachment, substantially as shown and described.

2. A filtering device consisting of a funnel, the apex end of which is enlarged, and a funnel-shaped attachment secured in said enlarged end concentrically thereof, whereby an annular space is formed around said funnel-shaped attachment, and a filtering-paper of conical shape set into said funnel, and the apex of which passes through said funnel-shaped attachment, the walls of said filtering device being fluted or plaited and resting against said funnel, substantially as shown and described.

3. The herein-described filtering device, comprising a funnel 5, the apex end of which is enlarged, a funnel-shaped attachment 9 secured concentrically in the enlarged end of said funnel, whereby an annular space is formed around said funnel-shaped attachment, and a filtering device 13 composed of filtering-paper, said device being conical in form, substantially as shown and described.

4. In a filtering device, a funnel the apex end of which is enlarged and conical in form, and a funnel-shaped or conical attachment secured in said enlarged apex concentrically thereof, whereby an annular space is formed around said attachment, said annular space being open at its upper and lower ends, and said attachment being also open at both ends, substantially as shown and described.

In testimony that I claim the foregoing as my invention I have signed my name, in presence of the subscribing witnesses, this 18th day of August, 1898.

CHARLES O. GRUBE.

Witnesses:
F. A. STEWART,
C. C. OLSEN.